March 2, 1965     M. H. ORTNER ETAL     3,171,192
ARTICLE AND METHOD OF FABRICATING SAME
Filed Sept. 22, 1961     3 Sheets-Sheet 1
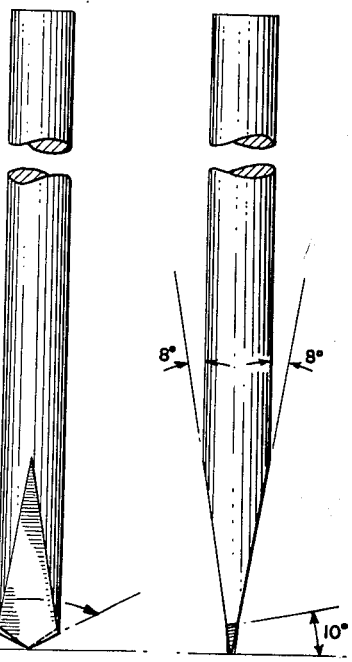
FIG. 2A
FIG. 2B
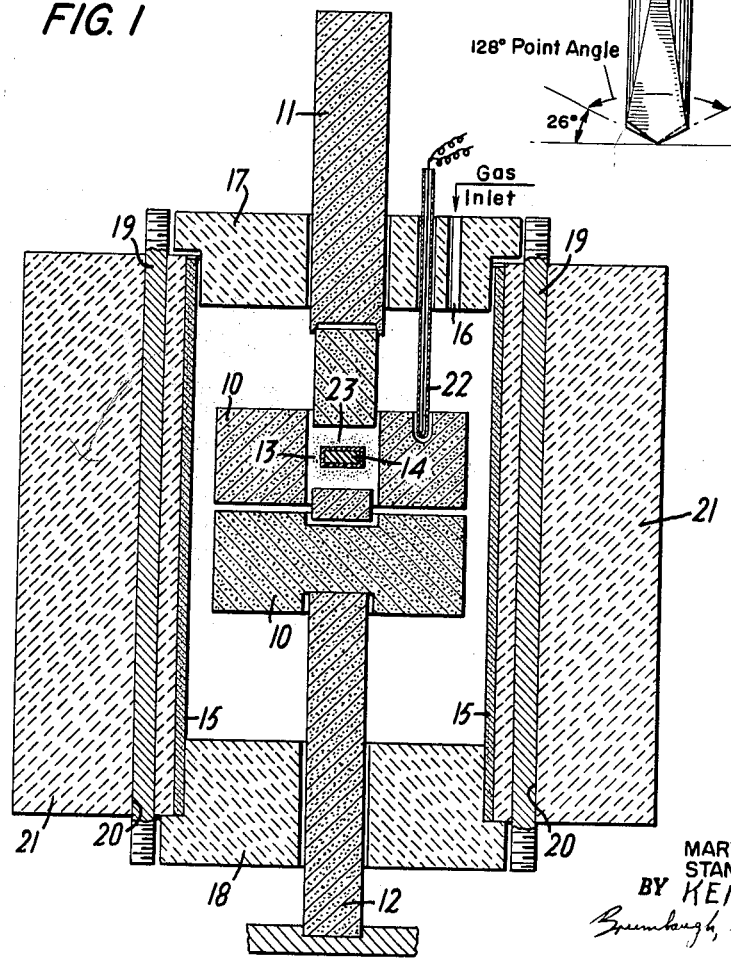
FIG. 1
INVENTORS.
MARTIN H. ORTNER &
STANLEY J. KLACH
BY KENNETH A. GEBLER
their ATTORNEYS.

March 2, 1965 M. H. ORTNER ETAL 3,171,192
ARTICLE AND METHOD OF FABRICATING SAME
Filed Sept. 22, 1961 3 Sheets-Sheet 3

INVENTORS.
MARTIN H. ORTNER &
STANLEY J. KLACH
BY KENNETH H. GEBLER their ATTORNEYS United States Patent Office 3,171,192
Patented Mar. 2, 1965

3,171,192
ARTICLE AND METHOD OF FABRICATING SAME
Martin H. Ortner, Oakland, Stanley J. Klach, Riverdale, and Kenneth A. Gebler, Dover, N.J., assignors to Vitro Corporation of America, New York, N.Y., a corporation of Delaware
Filed Sept. 22, 1961, Ser. No. 140,131
14 Claims. (Cl. 29—182.2)

This invention relates to articles having cemented carbide coatings and to a method of preparing such articles. More particularly, this invention is concerned with novel carbide-coated cutting tools and similar articles and to a method for their preparation. The invention also relates to novel carbide compositions useful in preparing the articles of this invention.

Carbide tools and dies are sintered products containing one or more of the metal carbides, such as the carbides of tungsten, titanium, columbium and tantalum, cemented together by a metal from the iron group, preferably cobalt. Silicon carbide and boron carbide are also extensively used. The intrinsic hardness of these carbide compositions at high temperatures makes them highly suitable for use in metal cutting operations and permits higher machining and drawing rates and longer tool and die life than is possible in tool steel articles.

Because of their unusual hardness, the forming and shaping of carbide cutting tools creates a number of problems and these manufacturing difficulties are reflected in the higher cost of the carbide tools. This is particularly true of tools of complex shape. A diamond wheel must be used, and the grinding process is long and expensive. The carbide tools have another serious disadvantage in that they are brittle and may fail under mechanical shock. These defects are particularly noticeable where the carbides are used to form drills and end mills, the carbides lacking sufficient ductility to be useful as cutting tools of this type.

The thermal conductivity of materials used in preparing cutting tools is an important consideration. Carbides have a relatively low thermal conductivity. Solid carbide tools because of their low thermal conductivity, do not provide efficient removal of the heat absorbed by the tool at the cutting surface. It is, therefore, desirable that carbide cutting tools be provided with a more highly heat conductive interior portion to facilitate removal of the heat which enters the tool.

The Fahnoe and Shyne patent, U.S. 2,858,256, discloses structures which comprise a metal base member such as stainless steel, having an external layer of abrasive particles bonded thereto by a metallic bond. Tungsten carbide and boron carbide particles are disclosed and are held in place by metallic nickel applied from an electroplating bath. While these articles are useful for a number of purposes, they are not suitable for use as cutting tool for high strength metals or for other purposes where the full strength and hardness of a sintered carbide is required.

It is an object of this invention to provide an article having a cemented carbide surface securely bonded thereto and to provide a method of making said article.

It is another object of the invention to provide an improved method of making carbide cutting and grinding tools and dies of complex and irregular shapes.

It is another object of the present invention to provide cutting tools which have the desirable properties of both steel and carbide cutting tools and which obviate the above-mentioned disadvantages of each.

Another object of the invention is to provide a metal structure having a layer of a carbide of controlled composition and thickness securely bonded to the surface thereof.

A further object of this invention is to provide a method for preparing an improved cutting tool including the steps of depositing a carbide composition of controlled thickness on a metal substrate, compressing the coating to increase its density and securely bonding the coating to the substrate.

Still another object of this invention is the provision of novel carbide coating compositions.

Other objects of the present invention and advantageous features thereof will be apparent as the description proceeds.

It has now been found that articles having a cemented carbide surface such as that found in high quality carbide cutting tools and dies are provided by a structure comprising (1) a base member or substrate of desired configuration and having certain critical characteristics and (2) a layer of cemented carbide material of certain critical characteristics securely bonded to the cutting surface of the base member by a (3) diffusion zone, the constituents of the diffusion zone being restricted to the materials found in the base member and coating. The useful life of the cutting tools and dies of this invention is equal or superior to solid carbide tools prepared from the same carbide materials and is several times as great as tools prepared from metals or alloys.

The articles of the present invention are preferably formed by electrophoretically co-depositing a mixture of carbide and binder metal powders on a pre-formed base member, compressing the coating to increase its density, and sintering the coating to bond the deposit to the base member. It is preferred that the compression or densification step occur while the coated article is at the sintering temperature. Preferably, also, the coating materials include a small amount of boron powder to reduce the sintering temperature of the coating.

The method we have used to co-deposit a mixture of powders on a base member is by electrophoretic deposition but it should be understood that other deposition techniques may be used. We prefer electrophoresis because the deposition itself can be precisely controlled through close control of the main parameters of the electrophoretic process, i.e., the voltage applied between the electrodes, the relative spacing of the electrodes, the duration of the process and the dispersion concentration. Although this precise control can only be obtained within certain parameter ranges, in general the rate of deposition increases both with increased voltage and increased dispersion concentration and decreases with increased electrode spacing; the amount of deposition increases as the period of deposition is increased.

Electrophoretic deposition occurs when an electrostatic field is established between two electrodes immersed within a colloidal or gross dispersion of charged particles, thus causing migration of the suspended particles toward one of the electrodes and producing the deposit of an adherent coating on that electrode. Exceptional uniformity of coating thickness, coating composition, and compacting (with an attendant relatively high coating density) are obtained as compared with dipping, spraying, brushing and other more conventional methods of application. Irregularly-shaped objects can be coated with excellent uniformity and reproducibility of coating.

The liquid phase which is the carrier for the charged particles in the electrophoretic deposition, must be a relatively non-conductive fluid. A relatively non-conductive fluid in this context is a fluid having a conductivity less than $10^{-5}$ ohm-cm. Examples of this type of fluid are: alcohols such as methyl, ethyl and isopropyl alcohols;

ketones such as acetone; esters such as ethyl acetate; and aromatics such as nitrobenzene.

When electrophoresis is used the base material which receives the electrophoretic deposition must be a material which either inherently possesses electron-conducting bands, i.e., ferrous and non-ferrous metals and associated alloys or which is capable under certain conditions of obtaining electron-conducting bands, i.e., semiconductors.

The base material must be sufficiently high melting that it retains its shape at the temperatures required for sintering the carbide coatings, i.e., above 1000° C. In addition, the substrate should have a linear coefficient of thermal expansion approximating that of the sintered carbide coating (approximately $5 \times 10^{-6}$ in./in./° C.) to insure formation of a strong and durable bond between the coating and the substrate during the sintering step. Finally, the substrate preferably is ductile and hard under machining conditions and has a low solubility in the carbide coating at the sintering temperatures to prevent deformation of the substrate which may occur at the sintering temperature due to the formation of low melting eutectics between the ingredients of the carbide coating and the substrate materials.

Examples of substrate materials found to be suitable for use with carbides containing a high level of tungsten carbide include the so-called "heavy-metal" alloys of tungsten which contain at least 80% tungsten. One such alloy found to be suitable contains 93% tungsten, 5% nickel and 2% copper. This material has a linear coefficient of thermal expansion of $6-7 \times 10^{-6}$ in./in./° C. Another suitable substrate material is Kovar, also known as Scott's alloy or Fernico, an iron-nickel-cobalt alloy having the composition 54% Fe—28% Ni—18% Co. The linear coefficient of thermal expansion of Kovar is $4.6 \times 10^{-6}$ in./in./° C. This alloy will withstand heating to 1400° C. without deformation.

The coating material employed according to this invention contains carbides and a cementing metal. The cementing metal may be a metal of the iron group or compounds of iron group metals which may be reduced to the metallic state under sintering conditions. The Fahnoe et al. patent discussed above discloses the use of iron group metal oxides in similar processes. Finely-divided cobalt metal is preferred.

The relative proportions of carbide and cementing metal are critical, affecting such properties as hardness, rupture strength, compressive strength, and impact strength of the coating. Generally, cementing metal additions vary between 3% and 20% by weight of the powder coating, the exact proportions depending upon the end use of the cemented carbide. When compounds are used, sufficient compound is employed to provide an amount of metal within this range after the reduction step.

The particle size of the cementing metal and the carbide must be such as to permit a high degree of densification during the sintering process. The prime reqisite is that the particle size range and distribution remain constant within close limits in order to achieve uniformity and reproducibility in the final product. In the manufacture of carbide cutting tools according to the present invention, the use of metal powders and carbide powders in the sub-sieve range, 1–20 microns, is preferred.

In addition to the metal carbides, the coating of this invention preferably contains a small increment of boron. The addition of this material permit sintering of the carbide at a lower temperature. A weight of boron equal to 0.1–6% of the weight of cobalt can be added to provide the desired lowering of the sintering temperature.

The term "carbide" as used in this application unless otherwise noted defines a composition containing one or more specific carbides of the type normally used in preparing high-strength cutting materials. While silicon carbide and boron carbide may be useful, the preferred carbides include the carbides of tungsten, titanium, tantalum, niobium, vanadium, zirconium, hafnium and molybdenum. The composition of several suitable coatings is given in the following table in which the numerals represent percent by weight of the total composition. In addition, special purpose materials may be produced by replacement of up to 10% of the weight of the tungsten carbide in the composition of the table by vanadium carbide, zirconium carbide, hafnium carbide or molybdenum carbide.

TABLE I

| Coating Composition | Tungsten Carbide | Cobalt [1] | Titanium Carbide | Tantalum Carbide | Niobium Carbide |
|---|---|---|---|---|---|
| 1 | 68.5 | 6.5 | 25 | | |
| 2 | 72 | 8.5 | 8 | 11.5 | |
| 3 | 74 | 11 | 8 | 5.5 | 1.5 |
| 4 | 82 | 10 | 8 | | |
| 5 | 90 | 6.5 | | 3.5 | |
| 6 | 94 | 6 | | | |

[1] A weight of boron equal to 0.1 to 6% of the weight of the cobalt can be substituted to provide lowering of the sintering temperature.

The invention will be further described with reference to the accompanying drawings, in which FIGURE 1 is a sketch of the hot pressing apparatus used in the method of this invention;

FIGURES 2A and 2B show the configuration of a spade drill blank used in the process of this invention;

Figure 3A:
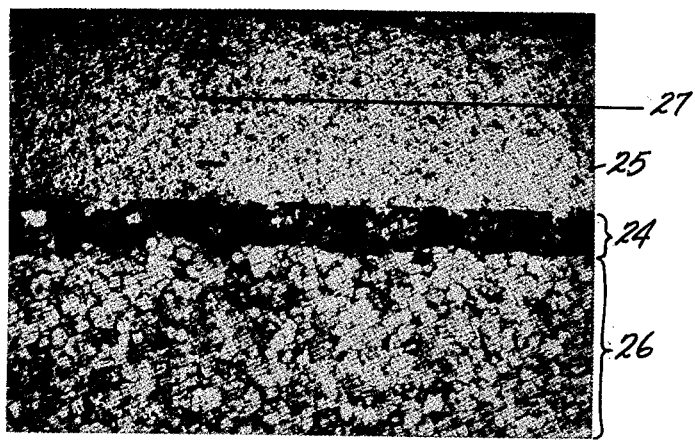
FIGURES 3A and 3B are photomicrographs of a cross section of the surface of a coated article prepared according to this invention, shown in two different magnifications.

Referring to the drawings in detail, the hot pressing apparatus shown in FIGURE 1 comprises a die 10 and plungers 11 and 12 which were machined from 1" and 2¾" diameter graphite rods to form a 0.12" diameter recess 13 which in turn is adapted to contain the coated article 14. The graphite assembly is formed from several pieces which are fitted together to insure accurate alignment of the die 10 and plungers 11 and 12. The pressing assembly is contained within a 3" inside diameter mullite tube 15 into which a non-oxidizing gas may be introduced through the opening 16 during processing to prevent oxidation of the graphite. The plungers 11 and 12 extend through firebrick caps 17 and 18 at each end of the furnace. Pressure is applied to the plunger 11 by a 75-ton hydraulic Dake press (not shown).

Four equally spaced 3" diameter Globar elements 19 are employed to heat the furnace and are positioned in channels 20 of the firebrick walls 21. A Pt/Pt/10% Rh thermocouple 22 is provided in the die to monitor the die temperature and leads to a Brown Recorder (not shown). The article 14 is surrounded by powdered boron nitride 23 to transmit uniform pressure to all faces and edges of the coated article 14.

The spade drill shown in FIGURES 2A and 2B represents the heavy metal alloy blank used in the experiment described in Example IV below.

Figure 3B:

FIGURES 3A and 3B are photomicrographs of a section taken longitudinally through the approximate vertex of the point of the coated spade drill described in Example V below, identified as drill No. 1 in the table. The section was mounted in Bakelite and etched with Murakami's etch. The photomicrographs of FIGURES 3A and 3B show a uniform and well-developed diffusion zone 24 between the outer sintered carbide coating 25 and the more granular heavy metal alloy base metal 26. In FIGURE 3A, the arrow 27 indicates indentations made by a microhardness testing apparatus.

The thickness of the cemented carbide coating shown in FIGURES 3A and 3B ranges from 0.007" to 0.015", and was formed by a plurality of successive coating and sintering steps, as described in Example V below. The depth at the diffusion zone 24 is approximately 0.002″. It is preferred, according to this invention, to provide a diffusion zone of at least about 0.001″ in depth.

Figure 4:
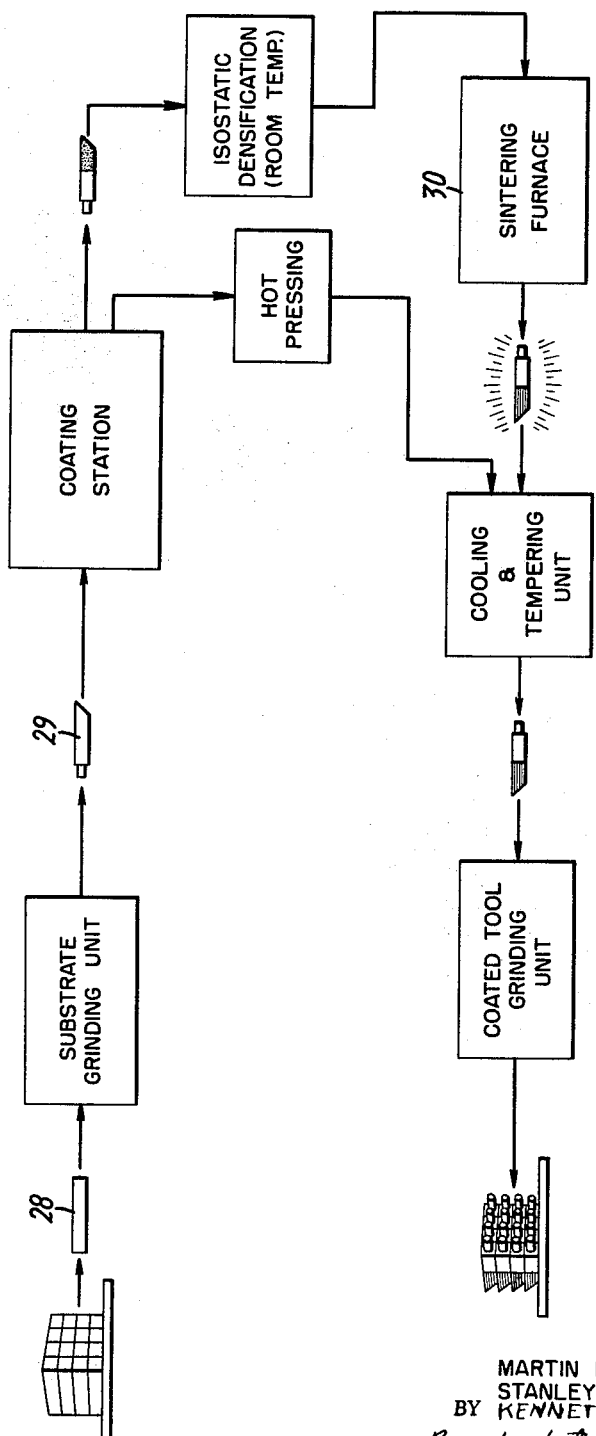
FIGURE 4 is a schematic flowsheet showing the steps followed in producing cutting tools according to the method of the present invention.

FIGURE 4 is a flowsheet showing the various steps in the method of preparing cutting tools according to the present invention. Referring to FIGURE 4, a blank 28 is subjected to a cutting or grinding operation so as to produce the configuration desired in the final cutting tool as at 29. An electrode is then attached to the article 29 as a cathode and the article is then passed to the coating station where it is immersed in an electrophoretic bath and a coating mixture of carbide and cobalt powder is deposited. According to one embodiment of the method of this invention, the coated tool is subjected to isostatic densification at room temperature and then moved on to a sintering furnace 30 where the coating is sintered for a time sufficient to form a diffusion zone. Alternatively, the coated tool is subjected to a hot-pressing operation in an apparatus such as described in FIGURE 1, this apparatus providing a sintering of the deposited coating under pressure. After cooling and tempering, the tool is polished and ground, if necessary, after which it is ready for use.

The articles produced according to this invention including cutting tools and dies surfaced with carbide cutting edges, represent a considerable advance over the prior art. As stated above, the coated cutting tool is preferable to a solid carbide tool in many applications because of its increased thermal conductivity. Another advantage of the carbide coated tools is their resistance to breakage and their simplicity in preparation.

While the invention has been particularly described with relation to cutting tools, it is understood that articles having surfaces prepared according to this invention are useful for many other purposes, such as glass cutters, dies, erosion-resistant valves, bearings and the like.

The following examples serve to illustrate the present invention without however limiting the same thereto.

*Example I*

A mixture of −325 mesh powders of 36.6 g. tungsten carbide, 1.0 g. titanium carbide and 2.3 g. cobalt was ball-milled with ¼″ steel balls for 72 hours in 25 ml. of isopropanol. The mill operated at 135 r.p.m. The ball-milled mixture was dispersed in a medium containing 230 ml. of isopropanol, 106 ml. of nitromethane, about 2 mg. of cobaltic nitrate hexahydrate, and a weight of zein equivalent to 2% of the total weight of solids.

The dispersion was placed in a steel beaker and electrodes were attached to the beaker and to a molybdenum tool steel lathe bit partially submerged in the dispersion so as to make the steel sample the cathode. While the dispersion was agitated, 250 volts direct current at 20 milliamperes were applied across the electrodes for one minute. The resulting coating was 0.003″ thick. The sample was dried and then heated in argon at 1300° C. for fifteen minutes by placing it in a furnace preheated to that temperature. The resulting coating was uniform, well-bonded and adherent. Microhardness measurements were made on the tool steel substrate and on the coating after mounting and polishing a fired sample. The hardness, by diamond indentation test with a Tukon Model MO Micro-hardness Tester, using a 50 gram load, was 909 kg./mm.$^2$ on the substrate and 1449 kg./mm.$^2$ on the carbide coating. The coated piece described in this example was tested as a glass cutter. The coated surface easily scratched a Pyrex beaker, while the steel substrate did not scratch the surface.

*Example II*

A number of coated lathe tool inserts were prepared according to this invention and tested to determine their tool life as regards their use in cutting various high strength metal alloys.

The base metal used in preparing the inserts was a "heavy-metal" alloy containing 93% by weight of tungsten, 5% by weight of nickel, and 2% by weight of copper. Heavy metal is a generic term for a family of tungsten-nickel-copper alloys containing at least 90% of tungsten. These materials have a high softening temperature and low nickel content and a linear coefficient of thermal expansion of 6–7×10$^{-6}$ in./in./° C.

The heavy metal inserts were prepared by milling a mixture comprising 93% of a tungsten powder (Sylvania Grade M10), 5% of a nickel powder (Charles Hardy Premium Grade) and 2% copper powder (electrolytic, U.S. Metals Refining Co.) for two hours in a steel ball mill, using isopropanol as a milling medium. After drying by evaporation, the batch was ground in a mortar with the addition of 1% cetyl alcohol dissolved in acetone, and passed, while damp, through a U.S. Standard No. 40 mesh screen. The granules were then pressed into small slugs at 7.5 t.s.i. and sintered in hydrogen.

In the sintering operation, a preliminary slow heating at a relatively low temperature was required to completely remove the wax binder and to prevent blistering and cracking of the specimen at sintering temperature. The following heating schedule was used.

SINTERING SCHEDULE FOR HEAVY METAL ALLOY

| Temperature (° C.) | Elapsed Time (hrs.) | Atmosphere |
|---|---|---|
| Room temp.: | | |
| 200 | 1 | Argon. |
| 300 | 2 | Do. |
| 400 | 3 | Do. |
| 500 | 3½ | Do. |
| 600 | 4 | Do. |
| 1,400 | 7 | Hydrogen. |
| 1,400 | 1½ | Do. |

NOTE.—Cool to room temperature at natural rate of furnace.

The heavy metal insert blanks prepared in the above manner were ground and machined to measure 0.470″ square x 0.095″ thick, and a ¹⁄₃₂″ nose radius was provided at the corners.

A dispersion of the coating materials was prepared by combining powders of the desired ingredients with suspending agents. For each 42.5 grams of powder, 575 cc. of isopropanol, 275 cc. of nitromethane, 0.85 gram of zein protein, and a trace of cobaltous nitrate hexahydrate were used. These materials were mixed by tumbling in a jar for one hour and then added to a small metal circulating tank which served as the anode in the electrophoretic depositing process. The compositions of the powders used, in percent by weight of the powder, are given in the following table.

TABLE II

COMPOSITION OF CARBIDE COATINGS AND COMMERCIAL LATHE TOOLS (WT. PERCENT)

| Sample | Tungsten Carbide | Cobalt | Titanium Carbide | Tantalum Carbide | Boron |
|---|---|---|---|---|---|
| Series 1, Samples 1–4 | 94 | 5.5 | | | 0.5 |
| Series 2, Samples 1–6 | 82 | 9.5 | 8 | | 0.5 |
| Adamas "A" | 94 | 6 | | | |
| Adamas "D" | 82 | 10 | 8 | | |
| Carboloy 370 | 72 | 8.5 | 8.0 | 11.5 | |
| Kennametal K-6 | 90 | 6.5 | | 3.5 | |

T-15 Steel—1.5C–4.75Cr–12.5W–5.0V–5.0Co–Balance Fe.
Stellite—Approx. 27Cr–3Ni–62Co–5Mo–1Fe–Balance C,Mn,Si.
N.B.—Adamas "A", Adamas "D" were production grade sintered carbide inserts obtained from the Adamas Carbide Corporation of Kenilworth, New Jersey. Carboloy 370 inserts are made by General Electric Company; Kennametal by Kennametal, Inc., Latrobe, Pennsylvania; Stellite by Haynes Stellite Company, a division of Union Carbide and Carbon, New York; and T-15 high-speed steel by Allegheny-Ludlum.

The heavy metal insert was suspended in the circulating dispersion of coating powder and a potential of 250 volts direct current was applied across the bath until the coated insert dimensions were approximately 0.575″ square x 0.190" thick. This coating thickness was developed in several steps and between each coat the sample was isostatically pressed at 7.5 t.s.i. and sintered at 1100–1150° C. at pressures of 2 t.s.i. for ten minutes. The coated sample was subjected to a final sintering by heating to 1350° C. in argon over a period of fifteen minutes, holding the sample at 1350° C. for one-half hour in a hydrogen atmosphere and cooling the sample to room temperature over a fifteen minute period under an argon atmosphere. During the step of holding at 1350° C. for one-half hour in hydrogen, pressure was isostatically applied to the insert in the apparatus shown in FIGURE 1 of the drawings. Various pressures ranging from ½ to 2 t.s.i. were applied. The insert was then finish ground to a standard 0.500" square x 0.125" thick. Before the finish grinding, the hot-pressed sample dimensions were typically 0.560" square x 0.135" thick.

The inserts thus prepared were tested for tool life. These tests were carried out on a 16" x 30" American Pacemaker Lathe equipped with a 30 h.p. variable speed drive. All turning tests were run dry at cutting speeds ranging from 45–600 feet per minute. The feed rate and depth of cut were held constant at 0.009"/rev. and 0.050", respectively. The work pieces used for the turning tests were 3" and 4" diameter x 18" long bars of AISI 4340 steel quenched and tempered to 300 and 500 BHN (Brinell), and AISI 1018 steel. Skin cuts were made on the 4340 steel prior to testing to eliminate the effects of heat treat scale. Hardness checks of the bars were made frequently during testing to be certain that the hardness did not change radically. The tests were discontinued at a uniform wearland of 0.015" or at tool failure, whichever occurred first. All of the inserts tested were used in standard tool holders which provided the following geometry:

Back rake, side rake, and relief angles —5°;
Side cutting edge angles and end cutting edge angles —15°.

The results of the tool life test on the inserts are given in the following table.

TABLE III
TOOL LIFE OF COATED AND COMMERCIAL SOLID LATHE TOOL INSERTS
(LIFE IN MINUTES AT INDICATED CUTTING SPEED TO 0.015" WEARLAND)

| Sample | Hot-press Pressure, t.s.i. | AISI 4340 (300 BHN) | | | | AISI 4340 (500 BHN) | | | | AISI 1018 (Annealed) 600 f.p.m. |
|---|---|---|---|---|---|---|---|---|---|---|
| | | 90 f.p.m. | 150 f.p.m. | 200 f.p.m. | 375 f.p.m. | 45 f.p.m. | 100 f.p.m. | 150 f.p.m. | 200 f.p.m. | |
| 1-1 | ½ | | [1] 0'10" | | | | | | | [1] 0'50" |
| 1-2 | 1 | | [1] 0'10" | | | | | | | [1] 0'15" |
| 1-3 | 1½ | | 8'30" | | | | | | | 3' |
| 1-4 | 2 | | 8'30" | | | | | 7' | | 5'25" |
| 2-1 | ½ | | [1] 1'10" | | | | | | | 0'15" |
| 2-2 | 1 | | 29'30" | | | | 40'30" | 20'45" | 6'30" | 6'40" |
| 2-3 | 1½ | | 27' | 19' | | | | | | 8'10" |
| 2-4 | 2 | | 34'30" | | | | | | | 9'20" |
| 2-5 | (2-3 on edge) | | 31' | | | | | | | |
| 2-6 | (2-4 on edge) | | 41' | | | | | | | |
| Commercial Inserts | | | | | | | | | | |
| Adamas "A" | | | 12' | 1'30" | | | 20' | 8'30" | | 11'30" |
| Adamas "D" | | | 44' | | | | 42'30" | 20' | 4'45" | |
| T-15 HSS | | 23' | | | | 15' | | | | |
| Stellite | | 30'30" | | | | 21' | | | | |
| Carboloy 370 | | | | | 26' | | | | 32' | |
| Kennametal K-6 | | | 14' | | | | 26' | 12' | | |

[1] Coating fractured away from substrate.

*Example III*

An additional number of carbide coated lathe tool inserts were prepared and tested by the methods described in Example II above. The carbide coating composition employed in this example contained 74% by weight of tungsten carbide, 10.5% by weight of cobalt, 8% by weight of titanium carbide, 5.5% by weight of tantalum carbide, 1.5% by weight of niobium carbide, and 0.5% by weight of boron.

The tool life of the inserts of this example was determined according to the method set forth in Example II. The tool life of several commercial samples of lathe tool inserts having the same composition as those described in Example I were determined for the purposes of comparison. The results of the tests are given in the following table.

TABLE IV
TOOL LIFE OF HOT-PRESSED COATED LATHE TOOL INSERTS AND COMMERCIAL SOLID TOOLS (TOOL LIFE IN MINUTES TO 0.015 IN WEARLAND AT INDICATED CUTTING SPEED)

| Sample | Hot Pressing Time (min.) | AISI 1018 170 BHN 600 f.p.m. | AISI 4340 300 BHN | | AISI 4340 500 BHN | | Incoloy 901 150 BHND 100 f.p.m. |
|---|---|---|---|---|---|---|---|
| | | | 150 f.p.m. | 200 f.p.m. | 150 f.m.p. | 200 f.p.m. | |
| 3-1 | 10 | 28'50" | | 41'13" | 40'02" | | |
| 3-2 | 10 | | | | | 10'45" | 12'20" |
| 3-3 | 20 | 11'32" | | 35'12" | 50'46" | | |
| 3-4 | 20 | | | | | | 8'01" |
| 3-5 | 30 | 14'30" | | [1] 5'52" | | | |
| 3-6 | 30 | | | [1] 5'20" | | | 2'00" |
| Commercial Samples | | | | | | | |
| Adamas "A" | | 11'30" | 12' | 1'30" | 8'30" | | 18'00" |
| Adamas "D" | | | 44' | | 20' | 4'45" | |
| Carboloy 370 | | | | 32'30" | 8'35" | 1'30" | 6'00" |
| Kennametal K-6 | | | 14' | | 12' | | 16'00" |
| T-15 High speed steel | | | [2] 23' | | [3] 15' | | |
| Stellite | | | [2] 30'30" | | [3] 21' | | |

[1] Carbide coating chipped off.
[2] Data refer to cutting speed of 90 f.p.m.
[3] Data refer to cutting speed of 45 f.p.m.

It will be noted from Table IV above that the hot pressing time was varied from 10 to 30 minutes. With the exception of Incoloy 901, the inserts having coatings which were hot pressed for 10 minutes gave double the tool life obtained with commercial solid carbide and alloy tools. Incoloy 901 is an extremely tough, nonferrous alloy which requires a different carbide composition for best results. It is apparent from the above data that better coatings were obtained by short periods of hot pressing.

*Example IV*

A number of spade drills having the configuration shown in FIGURES 2A and 2B of the drawings were provided with a carbide coating using the coating method described generally in Example II. The base material used was a heavy alloy containing 93% tungsten, 5% nickel and 2% copper, the percentages being by weight. The spade drill blanks were machined from ¼" diameter heavy metal rods to a geometry as described in FIGURES 2A and 2B of the drawings.

Two coating compositions similar to those described in Example II were prepared. The formulae for the powdered metal component of the coating dispersions were as follows, the numbers indicating percent by weight:

| Coating No. | Tungsten Carbide | Cobalt | Titanium Carbide | Tantalum Carbide | Niobium Carbide | Boron |
| --- | --- | --- | --- | --- | --- | --- |
| 1 | 82 | 9.5 | 8 | | | 0.5 |
| 2 | 74 | 10.5 | 8 | 5.5 | 1.5 | 0.5 |

After coating at least 0.015–0.020" of the carbide coating on the lower ¼" of the drill by the electrophoretic deposition method described in Example II, the drills were subjected to a combined hot-pressing and sintering operation in the apparatus shown in FIGURE 1 of the drawings at 1360° C. for fifteen minutes at 2 t.s.i. After cooling, the drills were finish ground to a coating thickness of 0.010–0.015" on the flat faces, and 0.007–0.010" on the cutting edges.

The tool life of the coated spade drills prepared above was determined by operating the drills in a Cincinnati 16" sliding head box column drill press equipped with a variable speed drive on the spindle and having a variable feed. The depth of hole used was ¼". The results obtained on the coated drills were compared with those obtained with high speed steel drills prepared from Type T–15 steel having the composition given in Table II of Example II, the Type T–15 drills having the same geometry. The work material in this test was AISI 4340 steel quenched and tempered to 50 $R_c$ hardness. Active cutting oil was used as a cutting fluid and the cutting speed was 100 f.p.m. The rate of feed was 0.001 in./rev. The results obtained are summarized in the following table.

TABLE V
TOOL LIFE OF CARBIDE-COATED AND TYPE T–15 HIGH STEEL SPADE DRILLS

[Number of ¼" deep holes to tool failure]

| Sample No. | Number of Holes Drilled | Type of Failure |
| --- | --- | --- |
| 1–1 | 15 | The coating completely worn through. |
| 1–2 | 25 | Chisel edge chipped out. |
| 2–1 | 55 | Coating peeled off 80% of side of drill. |
| 2–2 | 63 | Chisel edge chipped out. |
| T–15 Steel | 16 | Point burned up. |
| T–15 Steel | 8 | Do. |

N.B.—T–15 Steel is a high speed tool steel supplied by Allegheny-Ludlum.

The data given above demonstrates the superiority of the carbide coating 2 over coating 1 in machining AISI 4340 steel. Samples 2–1 and 2–2 gave approximately three times the tool life of samples 1–1 and 1–2, and approximately four times the life of the T–15 high speed steel spade drill. The long life of the coated drills is clearly evident. Such drills provide a solution to the problem of drilling small holes in very hard material. Solid carbide drills are normally too brittle for this application. Thus, the ductility of the base material and the hardness of the carbide coating have been combined to provide a cutting tool having greatly improved performance characteristics.

*Example V*

A number of spade drills having the configuration shown in FIGURES 2A and 2B of the drawings were provided with a carbide coating using the method described generally in Example II. The base material used was a heavy metal alloy containing 93% tungsten, 5% nickel and 2% copper, the percentages being by weight. The spade drill blanks were machined from ¼" diameter heavy steel rods to a geometry as described with reference to FIGURES 2A and 2B. The drills were coated and ground in the same manner as the coated drills described in Example IV.

These studies were carried out with a boron modified coating comprising a powder containing 82% tungsten carbide, 8% titanium carbide, 9.5% cobalt and 0.5% boron. The electrophoretic dispersion prepared from these materials contained the following quantities of materials:

Boron modified carbide _____ grams__ 42.5
Isopropanol _____ cc__ 575
Nitromethane _____ cc__ 275
Zein _____ grams__ 0.85
Cobalt nitrate hexahydrate _____ Trace The tool life of the coated spade drills prepared in this example was evaluated using the test described in Example IV and compared with the tool life of T–15 high speed steel drills. An active cutting oil was used in these tests and the feed rate was 0.001 in./rev. The table below summarizes the results obtained.

TABLE VI
TOOL LIFE TEST RESULTS IN CARBIDE-COATED AND T–15 COBALT HSS SPADE DRILLS

[Number of ¼" deep holes to indicated wearland]

| Work Material | Cutting Speed (ft./min.) | Carbide-Coated Drill No. | T–15 HSS Drill | Wearland (in.) |
| --- | --- | --- | --- | --- |
| AISI 4340 50 $R_c$ | 70 | 1—12 holes [1] | 9 holes | 0.006 |
| | 85 | 2—25 holes | 15 holes | 0.012 |

[1] Small chip on corner; test stopped.

The hardness of the carbide coating applied to coated spade tool No. 1 was evaluated on a cross section of the coated drill by the Knoop Hardness Test using a 500 gram weight. Knoop hardness numbers were determined at various depths below the surface of the coating to the diffusion zone between the coating and the base member. Determinations were made at six sites on the side surfaces near the tip of the drill ranging from 0.010 to 0.100 inch from the tip. The average values for the six sites at the various depths investigated are given in the following table.

| Depth below surface (in.): | Average Knoop Hardness number |
|---|---|
| .002 | 994 |
| .005 | 1057 |
| .010 | 1159 |
| Diffusion zone | 1763 |

It will be noted that the hardness of the coating increases as the diffusion zone is approached.

*Example VI*

A number of coated lathe tool inserts were prepared according to this invention. The insert blanks were prepared of a heavy metal alloy of the type described in Example II and were formed according to the method for preparing sintered base members described in Example II. The sintered insert blanks had the dimensions of ⅛ x ¼ x ¼ inch. Tungsten carbide-cobalt-boron coatings were electrophoretically applied from a dispersion having the following composition:

| | |
|---|---|
| 94% WC—6% Co powder _____grams__ | 42.3 |
| Boron powder _____do____ | 0.20 |
| Zein protein _____do____ | 0.85 |
| Isopropanol _____cc__ | 575 |
| Nitromethane _____cc__ | 275 |
| Cobalt nitrate _____ | Trace |

The coated specimens were air-dried, isostatically densified at 7.5 t.s.i. and sintered in hydrogen for thirty minutes at 1350°–1400° C.

All of the coatings were firmly bonded to the tungsten alloy substrate regardless of the firing temperature.

This application is a continuation-in-part of Serial No. 146,027, filed August 28, 1961, and now abandoned.

We claim:

1. A method of fabricating cutting tools having a core of a metal which retains its shape at temperatures above 1000° C. and a surface coating of cemented carbide strongly bonded thereto, comprising the steps of providing a core member of said metal having a carbide-free surface, depositing on the carbide-free surface of the core member a uniform thin coating of a powdered mixture of a carbide and a material selected from the group consisting of metals of the iron group and their reducible compounds, and sintering the powdered mixture while maintaining it in contact with the surface of the core member for a time sufficient to develop a diffusion zone between the carbide coating and the core member.

2. The method of claim 1 wherein the base member has a linear coefficient of thermal expansion approximating that of the sintered coating.

3. The method of claim 1 wherein the powdered mixture is applied to the carbide-free surface of the core member by electrophoretic deposition.

4. The method of claim 1 wherein the carbide coating is compacted by applying pressure thereto prior to the sintering step.

5. The method of claim 1 wherein the carbide coating is compacted by applying pressure thereto within the approximate range of 0.5 to 7.5 t.s.i. during the sintering step.

6. A method of fabricating cutting tools having a heavy metal tungsten alloy core and a surface coating of cemented carbide strongly bonded thereto comprising the steps of providing a core member of said metal having a carbide-free surface, depositing on the carbide-free surface of the core member a uniform thin coating of a powdered mixture of a carbide selected from the group consisting of the carbides of tungsten, titanium, tantalum, niobium, vanadium, zirconium, hafnium and molybdenum, and a cementing metal selected from the group consisting of cobalt and heat reducible cobalt compounds, and sintering the powdered mixture while maintaining it in contact with the carbide-free surface of the core member under pressure within the approximate range of 0.5 to 7.5 t.s.i. for a time sufficient to develop a diffusion zone between the carbide coating and the core member.

7. The method of claim 6 wherein the coating is applied to the base member by electrophoretic deposition.

8. The method of claim 6 wherein the coating is applied to the base by electrophoretic deposition and wherein the deposited coating is sintered while applying pressure thereto.

9. A cutting tool comprising a core member of a metal which retains its shape at temperatures above 1000° C., a cemented carbide coating thereon as a cutting surface and a diffusion zone forming a bond between the core and the carbide cutting surface, the carbide coated cutting surface consisting essentially of a sintered powdered mixture of cementing metal selected from the group consisting of metals of the iron group and their heat-reducible compounds, and a carbide selected from the group consisting of the carbides of tungsten, titanium, tantalum, niobium, vanadium, zirconium, hafnium and molybdenum, the constituents of the diffusion zone being restricted to the materials in the core member and the cutting surface.

10. The article of claim 9 wherein the diffusion zone has a thickness of at least 0.001 inch.

11. The article of claim 9 wherein the cementing metal is cobalt.

12. A cutting tool comprising a heavy metal tungsten alloy core, a coating of a sintered powdered mixture of cementing metal selected from the group consisting of cobalt and heat-reducible cobalt compounds, boron, and a carbide selected from the group consisting of the carbides of tungsten, titanium, tantalum, niobium, vanadium, zirconium, hafnium and molybdenum, and a diffusion zone forming a bond between the core and the carbide cutting surface, the constituents of the diffusion zone being restricted to the materials found in the base member and coating.

13. A cutting tool comprising a core member of a heavy metal alloy containing at least 80% tungsten, an electrophoretically deposited coating on the core serving as a cutting surface for the tool and consisting essentially of a sintered mixture of carbide, cobalt and boron powders, and a diffusion zone between the core member and sintered cutting surface forming a hard and secure bond between the core member and the cutting surface, the carbide of the sintered mixture being selected from the group consisting of the carbides of tungsten, titanium, tantalum, niobium, vanadium, zirconium, hafnium, and molybdenum.

14. A cutting tool comprising a core member of a heavy metal alloy containing 93% tungsten, 5% nickel and 2% copper; a coating on the surface of the core member consisting essentially of a sintered mixture of carbide, cobalt and boron powders, the carbide being selected from the group consisting of the carbides of tungsten, titanium, tantalum, niobium, vanadium, zirconium, hafnium and molybdenum; and a diffusion zone between the core member and sintered coating forming the sole bond between the core member and the sintered coating.

References Cited in the file of this patent

UNITED STATES PATENTS

| | | |
|---|---|---|
| 1,904,568 | Taylor | Apr. 18, 1933 |
| 2,032,694 | Gertler | Mar. 3, 1936 |
| 2,191,666 | Kieffer | Feb. 27, 1940 |
| 2,582,231 | Catallo | Jan. 15, 1954 |
| 2,681,876 | De Santis | June 22, 1954 |
| 2,711,980 | De Santis | June 28, 1955 |
| 2,778,757 | Wellborn | Jan. 22, 1957 |
| 2,791,025 | Ballhausen | May 7, 1957 |
| 2,804,406 | Yntema | Aug. 27, 1957 |
| 3,020,632 | Krikorian | Feb. 13, 1962 |